G. W. ITTNER.
LOADING AND UNLOADING MECHANISM FOR MOTOR TRUCKS.
APPLICATION FILED OCT. 15, 1917.

1,289,786.

Patented Dec. 31, 1918.
5 SHEETS—SHEET 1.

WITNESS
W. A. Alexander.

INVENTOR.
G. W. ITTNER
BY
E. E. Huffman
ATTORNEY.

G. W. ITTNER.
LOADING AND UNLOADING MECHANISM FOR MOTOR TRUCKS.
APPLICATION FILED OCT. 15, 1917.
1,289,786.
Patented Dec. 31, 1918.
5 SHEETS—SHEET 2.
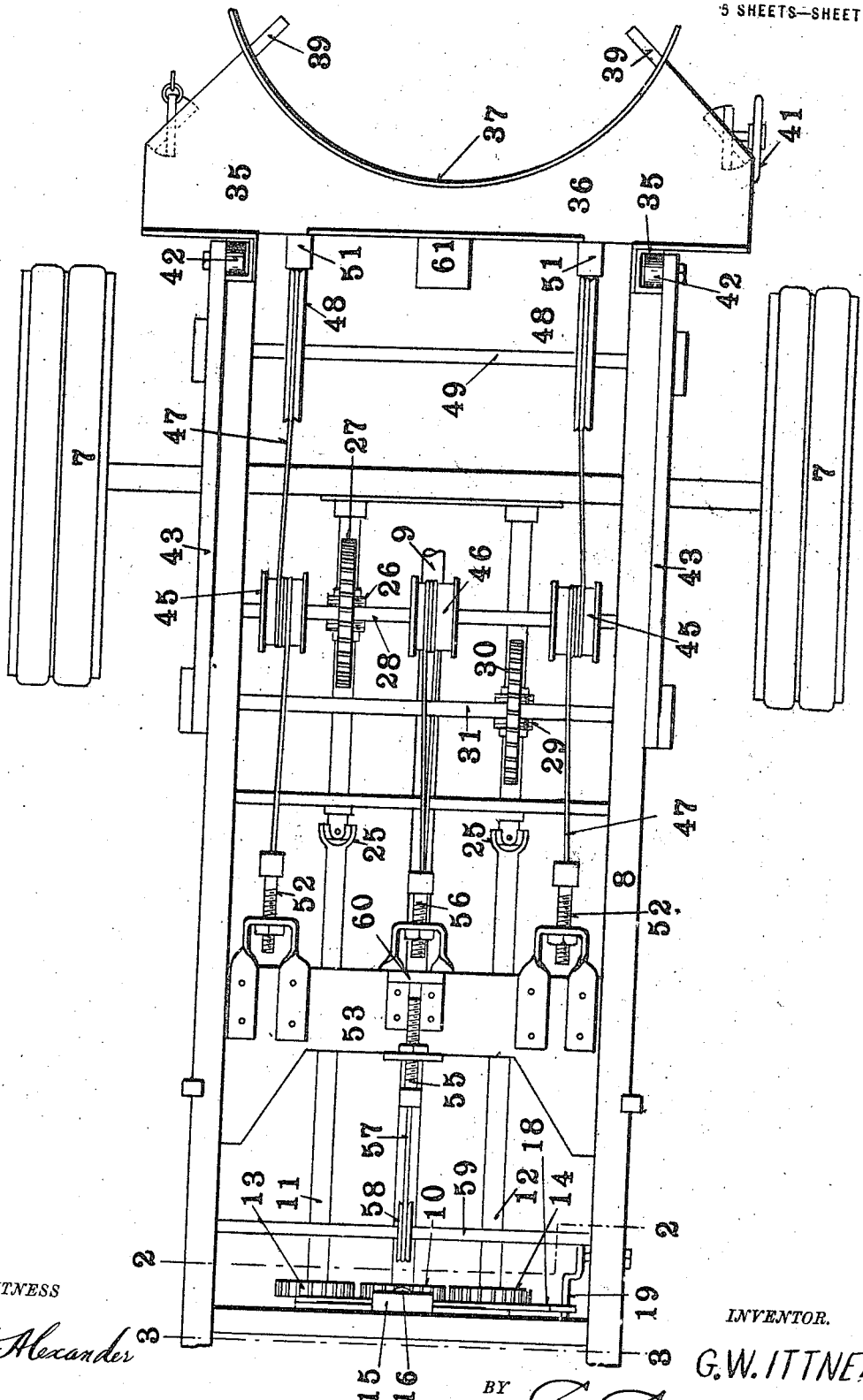
Fig. 4.
WITNESS
W. H. Alexander
INVENTOR.
G. W. ITTNER
BY
ATTORNEY.

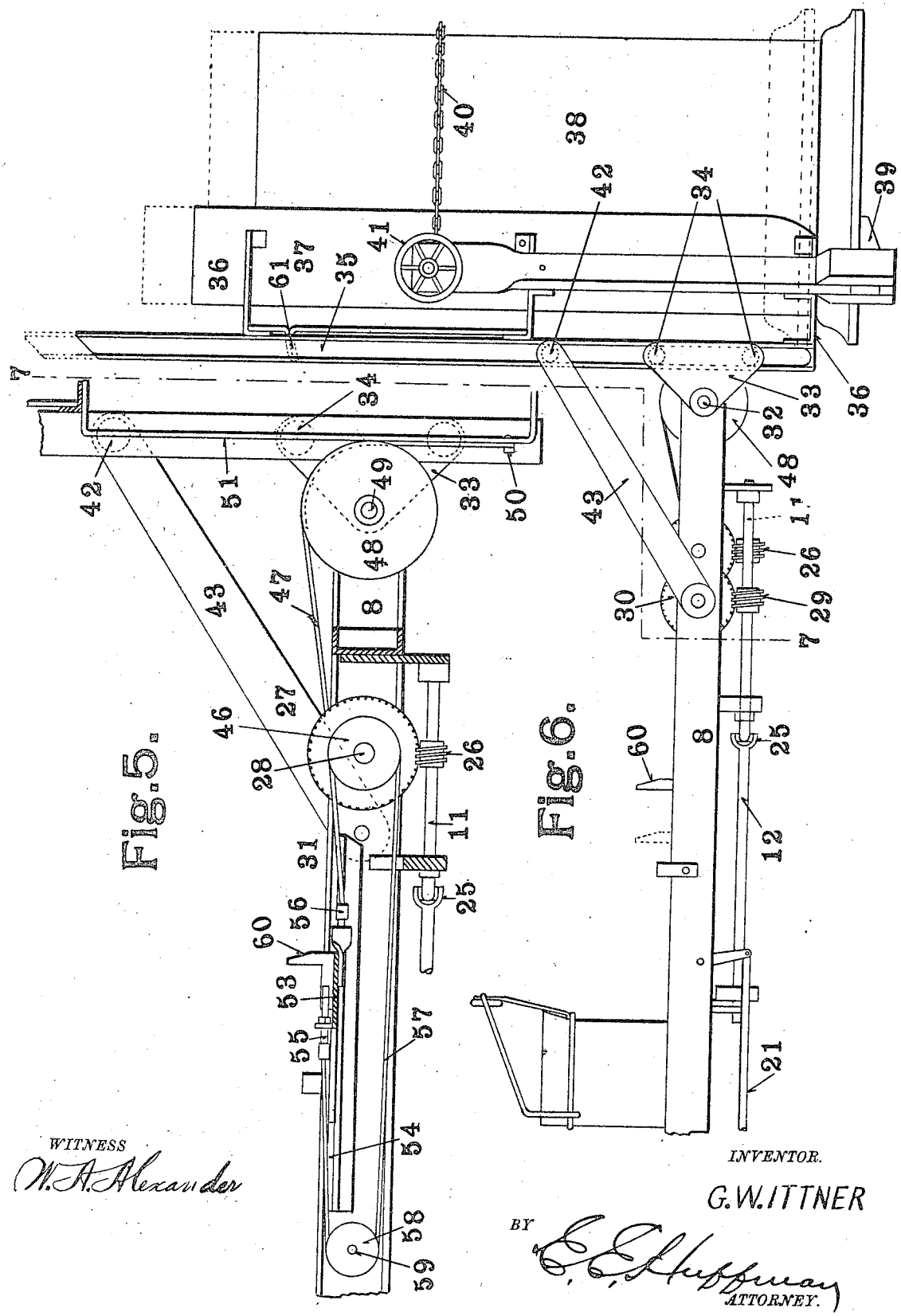

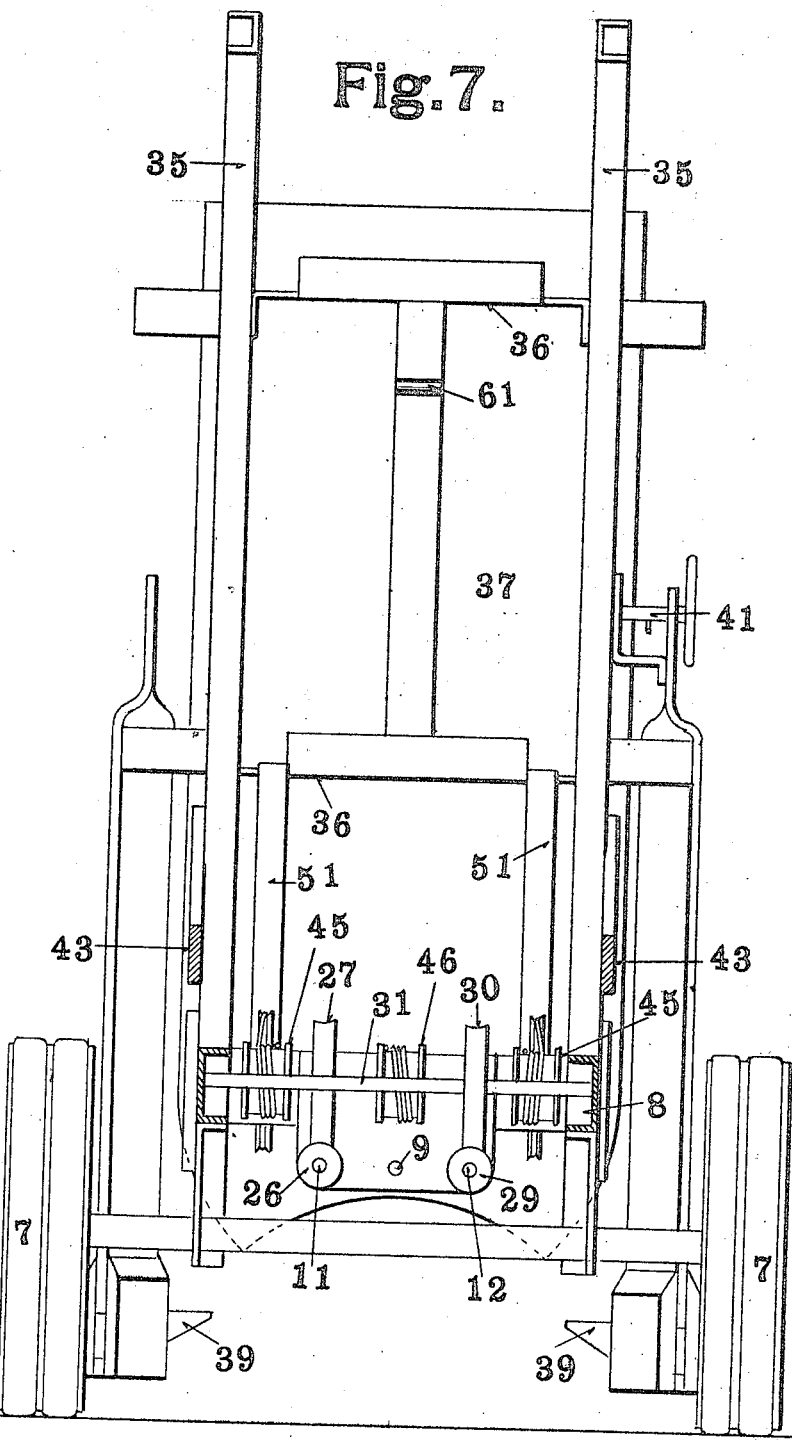

G. W. ITTNER.
LOADING AND UNLOADING MECHANISM FOR MOTOR TRUCKS.
APPLICATION FILED OCT. 15, 1917.

1,289,786.

Patented Dec. 31, 1918.

INVENTOR.
G. W. ITTNER
ATTORNEY.

UNITED STATES PATENT OFFICE.

GEORGE W. ITTNER, OF ST. LOUIS, MISSOURI.

LOADING AND UNLOADING MECHANISM FOR MOTOR-TRUCKS.

1,289,786.                   Specification of Letters Patent.        Patented Dec. 31, 1918.

Application filed October 15, 1917.   Serial No. 196,744.

*To all whom it may concern:*

Be it known that I, GEORGE W. ITTNER, a citizen of the United States of America, residing at the city of St. Louis, State of Missouri, United States of America, have invented a certain new and useful Loading and Unloading Mechanism for Motor-Trucks, of which the following is such a full, clear, and exact description as will enable any one skilled in the art to which it appertains to make and use the same, reference being had to the accompanying drawings, forming part of this specification.

My invention relates to a loading and unloading mechanism for motor trucks, and has for its object the production of such a device which will be simple in construction and effective in operation. One of the special objects of my invention is to so construct the device that the body of a truck may be swung from a horizontal to a vertical position, and raised and lowered while in the vertical position.

Figure 3:
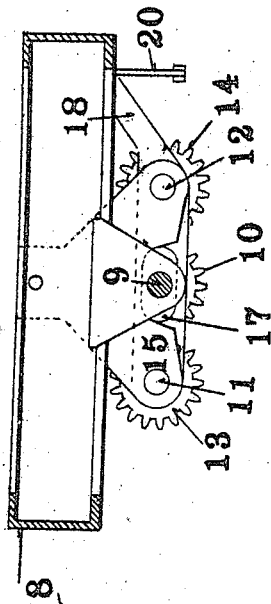
Figure 2:
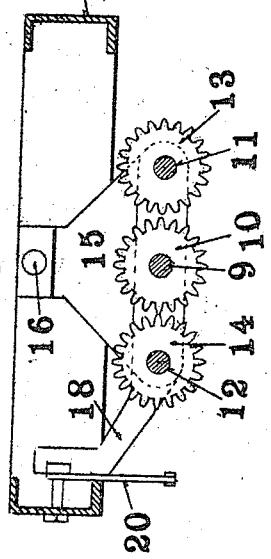
Figure 1:
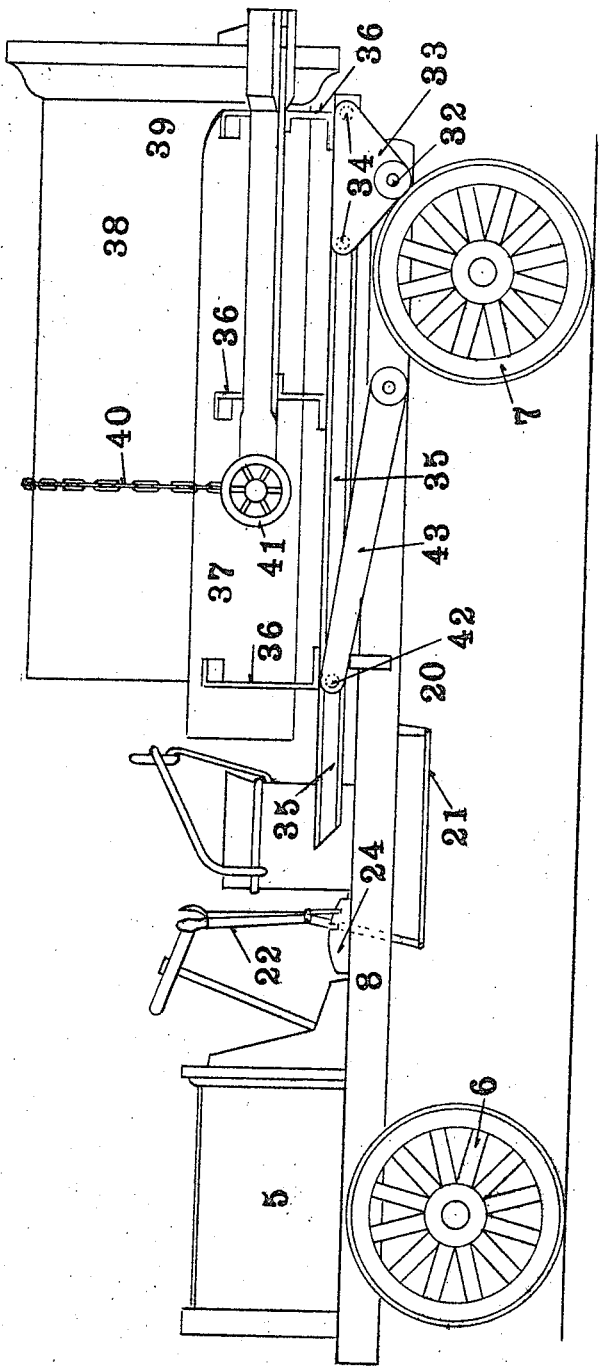
Figure 8:
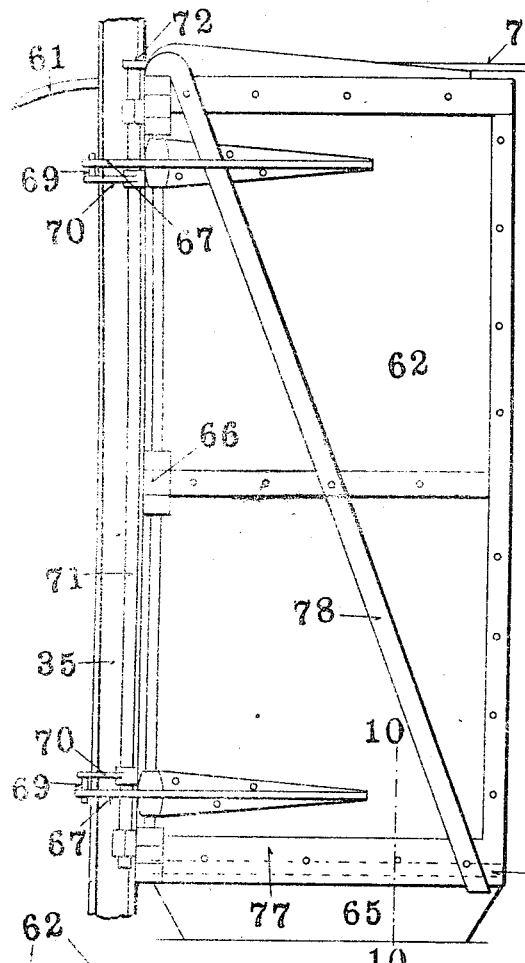
Figure 10:
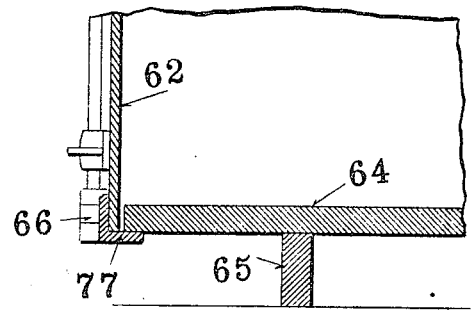
Figure 9:
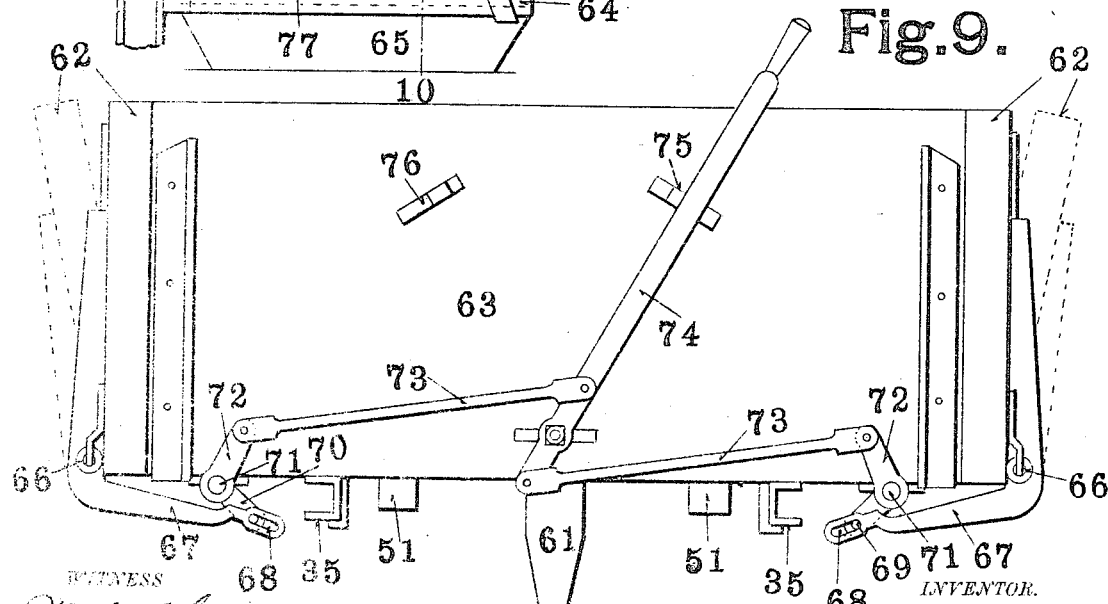

In the accompanying drawings, which illustrate one form of a device made in accordance with my invention, together with a slight modification thereof, Figure 1 is a side elevation; Fig. 2 is a sectional view taken on the line 2—2 of Fig. 4; Fig. 3 is a sectional view taken on the line 3—3 of Fig. 4; Fig. 4 is a top plan view, the body of the truck being raised into vertical position; Fig. 5 is an enlarged sectional view through a portion of the truck; Fig. 6 is a side elevation, showing the body in raised position; Fig. 7 is a sectional view taken on the line 7—7 of Fig. 6; and Figs. 8 and 9 are a side and a top view respectively, showing a modified form of body; and Fig. 10 is a section taken on the line 10—10 of Fig. 8.

Like marks of reference refer to similar parts in the several views of the drawings.

5 represents the hood; 6 the front wheels; 7 the rear wheels, and 8 the supported frame of a motor truck. These parts may be of any usual and well known form. 9 is a driving shaft, by means of which power is communicated from the motor in the hood 6 to the rear wheels 7. The said connection, however, is not shown, as it forms no part of my invention. The movements of the truck body are actuated by the driving shaft 9. Said driving shaft has rigidly secured to it a gear wheel 10, as shown in Figs. 2, 3 and 4 respectively. 11 and 12 represent shafts carrying gear wheels 13 and 14, adapted to be thrown into mesh with the gear wheel 10 on the shaft 9. The forward ends of the shafts 11 and 12 are carried in a rocking frame 15 pivoted at 16 to the frame 8 of the truck. This frame 15 is provided with an opening 17 through which the driving shaft 9 passes, and said frame has attached to it an arm 18, engaging with an arm 19, forming one part of a bell crank lever 20, the lower end of which is attached to a rod 21, connected to a hand lever 22. This hand lever 22 engages with notches in an arc 24, so that when the said hand lever is in the central notch, the wheels 13—14 will be both out of mesh with the wheels 10, as shown in Fig. 2 of the drawings. When, however, the lever is engaged with one of the end notches, one or the other of the wheels 13—14 is moved into engagement with said wheel 10, in order to move the body of the truck either upon its pivot, or slidingly, as will be hereinafter more fully set forth. In order to allow of the movements of the wheels 13—14, shafts 11 and 12 are provided intermediate of their ends with universal joints 25. The shaft 11 has upon it a worm 26, engaging with a worm-wheel 27 upon a shaft 28, and the shaft 12 has upon it a worm 29, engaging with a worm-wheel 30 upon a shaft 31. These shafts 28 and 31 are adapted to move the body, as will be hereinafter described. The frame 8 has pivoted to it at 32 a plate 33, carrying a pair of rollers 34, sliding in a channel bar 35. The two channel bars 35 form a portion of the base of the body. In the form shown in Fig. 1 of the drawings, these channel bars 35 have secured to them three plates 36, to which is attached a semi-circular plate 37, adapted to hold a large pipe 38 (Figs. 1 and 6), as this particular form of body is adapted to move large pipes from one place to another. The pipe 38 is held in position by means of removable fingers 39 and a chain 40, engaging with a suitable locking device 41. Each of the channel bars 35 is also engaged by a roller 42, carried by an arm 43, rigidly secured to the end of the rock shaft 31, hereinbefore referred to. It will be evident that when the rock shaft 30 is rotated, the arm 43 will be actuated to move the channel bars which form the base of the body either from a horizontal to a vertical position, or vice versa. The shaft 28 above referred to is provided with a pair of drums 45, arranged near its end, and a central drum 46. Passing around the drum 45 are ropes or cables 47, which ropes or cables, after passing over wheels 48 loosely mounted on a shaft 49, are connected at 50 (Fig. 5) to guides 51, carried between the channel bars 35 on the body of the truck. The opposite ends of the ropes or cables 47 are secured at 52 to a sliding cross-piece 53 carried in guideways 54 (Fig. 5). This sliding cross-bar 53 has also secured to it at 55 and 56 respectively the ends of a cable 57, passing over a wheel 58 on the shaft 59, and around the drum 46, hereinbefore referred to. The cross-bar 53 is provided with an upwardly projecting part 60 adapted to engage with a projection 61 upon the lower face of the vehicle bed.

It will be evident that by throwing the wheel 14 into mesh with the wheel 10, so that the motor of the truck will rotate the shaft 12, the cross shaft 31 will be rotated, thus moving the arms 43. Supposing that the body is in the position shown in Fig. 1 of the drawings, and that the motor of the truck is run in such direction as to rotate the shaft 31 clockwise, the arm 43 will be moved upwardly and to the right, thus bringing the body into vertical position, as shown in Fig. 6 of the drawings. If the plate 15 is now moved to throw the wheel 14 out of engagement with wheel 10, and the wheel 13 into engagement with said wheel when the motor is operated, the shaft 28 will be rotated so as to move the body vertically, up or down. It will be evident, however, that this shaft can be rotated while the body is in horizontal position, and the bed then moved backward or forward upon the frame of the machine.

In order to adapt the truck for different purposes, it will only be necessary to unfasten the cables 47 from the guide 51 and remove the body from the vehicle, by sliding it longitudinally, after which a different body may be substituted.

In Figs. 8, 9 and 10 I have shown a body adapted to be used in hauling brick. In this body the channel 35 and the guides 51 are secured to the bottom of a box-shaped body, having sides 62; a front or top end 63, and a removable rear or lower end 64. This rear or lower end is preferably provided with downwardly projecting portions 65, adapted to form a rest when the body is loaded or unloaded. The sides 62 are hinged at 66, and are controlled by means of levers 67, provided at their ends with slots 68, engaging with pins 69 on levers 70, carried by rock shafts 71. These rock shafts 71 are moved by means of levers 72 engaged with links 73, pivoted to a hand-lever 74 carried upon the end 63. The lever 74 is adapted to engage with one or the other of a pair of stops 75 and 76 respectively. When the lever is engaged with stop 75, the sides 62 are held in their closed position, as shown in the full lines of Fig. 9. When the lever is moved into engagement with the stop 76, the sides 62 are thrown into the position shown in the dotted lines in said figure. The removable end 64 is supported by means of a pair of angle irons 77, which are secured to and form a part of the sides 62, as is best shown in Fig. 10 of the drawings. As will be evident from this figure, the flange of the angle iron 77 which is horizontal when the bed is in vertical position, supports the weight of the end 64 as the load is raised. A brace 78 is, therefore, preferably extended diagonally from the upper to the lower end of the bed.

The object of this form of bed will be evident. When it is desired to unload the brick contained in the body, the body is first brought into vertical position, in the same manner as hereinbefore described in connection with the body for carrying the pipe. The body is then moved vertically until the projections 65 on the removable end 64 engage with the ground, after which the lever 74 is moved to throw sides 62 into the position, shown in the dotted lines, so that the truck can be driven away from the brick, which are left standing upon the end 65. The opening of the sides 62 obviates all liability of overthrowing the pile of brick when driving away from the same.

Having fully described my invention, what I claim as new and desire to secure by Letters Patent of the United States is:

1. In a truck, the combination of a frame, a load carrying device mounted thereon, means for bringing said device to a substantially vertical position, means for raising and lowering the device while in said position, and guiding means for maintaining said device in vertical position while it is being raised and lowered.

2. In a truck, the combination of a frame, a bed slidingly mounted on said frame, means for bringing the bed to a vertical position, means for raising and lowering the bed while in vertical position, and guiding means for maintaining said device in vertical position while it is being raised and lowered.

3. In a truck, the combination of a frame, a bed pivotally and slidingly mounted on said frame, a pair of arms engaging with said bed to move same from a horizontal to a vertical position, a sliding member carried by said frame, and connections between said sliding member and said bed for raising and lowering same while in vertical position.

4. In a truck, the combination of a frame, a bed pivotally and slidingly mounted thereon, a pair of arms engaging with said bed to move it to a vertical position, a sliding member carried on said frame and engaging with the bed when same is in normal position, and flexible connections between said sliding member and the bed for raising and lowering the bed when it is in vertical position.

5. In a truck, the combination of a main frame, a bed frame pivotally and slidingly mounted thereon, a rock arm pivotally mounted on the main frame and pivotally and slidingly connected with the bed frame, and means for actuating the rock arm to tilt the bed frame, said sliding connections coöperating to guide said bed in a substantially vertical direction.

6. In a truck, the combination with a frame, of a bed pivotally mounted thereon, means for moving said bed into vertical position, a removable end and a pair of movable sides for the bed, means for actuating said sides, and supporting projections carried by said sides adapted to be moved under the said end.

7. In a truck, the combination with a frame, of a bed mounted on said frame and adapted to slide longitudinally thereon, a pivoted connection between said frame and bed, a sliding member, and flexible connections between said sliding member and bed, a projection carried by said sliding member, and a projection carried by said bed adapted to engage with said first named projection for moving the bed.

8. In a truck, the combination with a frame, of a bed mounted on said frame to slide longitudinally thereon, a pivoted connection between said bed and frame, a rotary member carried by said frame, means for actuating said rotary member, a sliding member actuated from said rotary member, flexible connections between said sliding member and bed, and a sheave over which said flexible connection passes, whereby horizontal movement of said sliding member moves said bed vertically.

9. In a truck, the combination with a frame, of a bed pivotally and slidingly mounted thereon, a driving shaft, a pair of shafts arranged adjacent to said driving shaft and each adapted to be driven therefrom, a sliding member actuated from one of said driven shafts, connections between said sliding member and bed for moving the same on the frame, and connections between said bed and the other of said driven shafts for moving said bed on its pivot.

10. In a truck, the combination with a frame, of a bed pivotally and slidingly mounted thereon, a pair of channel bars carried on said bed, a driving shaft, and a pair of driven shafts arranged adjacent thereto and adapted to be driven therefrom, a sliding member actuated from one of said driven shafts, flexible connections between said sliding member and bed, a pair of rock arms, and a connection between the other of said driven shafts to said rock arms, said rock arms engaging with said channel members to move the body on its pivot.

11. In a truck, the combination with a frame, of a bed slidingly mounted thereon and provided with a channel bar, a member pivoted to said frame and coöperating with said channel bar to form a sliding pivot for the bed, a second member movably carried by said bed and coöperating with said channel bar and said first named member to guide said bed in either a vertical or a horizontal direction, and a flexible member for moving said bed.

12. In a truck, the combination with a frame, of a bed slidingly mounted thereon and provided with a channel bar, a member pivoted to said frame and coöperating with said channel bar to form a sliding pivot for the bed, a second member pivotally carried by said bed, said member being adapted to tilt said bed on its pivot and coöperating with said channel bar and said first named member to guide said bed in either a vertical or a horizontal direction, and a flexible member for moving said bed.

In testimony whereof, I have hereunto set my hand and affixed my seal.

GEORGE W. ITTNER. [L. S.]